3,033,888
VINYL CYCLIC PHOSPHATES AND METHOD
OF PREPARATION
William S. Wadsworth, Jr., Willow Grove, and William D. Emmons, Huntingdon Valley, Pa., assignors to Rohm & Haas Company, Philadelphia, Pa., a corporation of Delaware
No Drawing. Filed Apr. 22, 1960, Ser. No. 23,897
19 Claims. (Cl. 260—461)

This invention relates to new compositions of matter and to their preparation. More especially, it deals with new and useful vinyl cyclic phosphates which are substituted in the 1 and 4 positions of the heterocyclic ring; a further embodiment deals with a method for preparing these compounds.

The compounds of the invention may be represented by Formula I:

$$\begin{array}{cc} CH_2Z & Y^1 \\ | & | \\ C(CH_2O)_3P(O)OC=C \\ | & | \\ CH_2X & R^1 \quad Y^2 \end{array} \quad (I)$$

in which X is a halogen atom having an atomic number ranging from 9 to 53 and including fluorine, bromine, chlorine, and iodine;

Z is (1) an atom of the class VIIA of the periodic chart of the elements having an atomic number of 1 to 53 and including the atoms hydrogen, chlorine, fluorine, bromine and iodine, (2) an alkyl group containing from 1 to 4 carbon atoms, and (3) an acyloxy group in which the acyl group contains from 1 to 12 carbon atoms;

$R^1$ is a hydrogen atom, an alkyl group containing from 1 to 4 carbon atoms, such as methyl, ethyl, isobutyl, isopropyl and the like; or $R^1$ is an alkoxy $R^1O—$ group in which $R^1$ has been defined above;

$Y^1$ is an atom of the class VIIA of the periodic chart of the elements having an atomic number of 1 to 53 and including the atoms, hydrogen, chlorine, bromine, fluorine and iodine;

$Y^2$ is an atom of the class VIIA of the periodic chart of the elements having an atomic number of 1 to 53 and including the atoms, hydrogen, chlorine, bromine, fluorine, and iodine; with the proviso that $Y^1$ and $Y^2$ are never a hydrogen atom concurrently.

The cyclic phosphates of the invention are named in accordance with the following nomenclature:

The atoms in the ring are counted starting with the phosphorous atom, followed by one of the oxygen atoms, and then the carbon atoms. The compounds are named phosphates to indicate that the phosphorous atom is pentavalent. The names of the compounds incorporate the term "propylene" to specify that the compounds incorporate three carbon atoms in the claim. The compounds are disubstituted on the carbon in the 4-position of the ring. The carbon atoms of the vinyl group are designated as alpha and beta, the alpha carbon being the carbon atom bonded to the phosphorous atom. In the claims, the compounds are named as phosphorinanes. The correspondence between the two types of nomenclature used is illustrated below:

NOMENCLATURE

| In the Specification | In the Claims |
|---|---|
| 4-chloromethyl-4-ethyl-propylene-1-β-dichlorovinylphosphate | 5-chloromethyl-5-ethyl-2-β-dichlorovinyloxy-1,3,2-dioxaphosphorinane-2-oxide |
| 4-chloromethyl-4-ethyl-propylene-1-α-ethoxy-β-chlorovinylphosphate | 5-chloromethyl-5-ethyl-2-α-ethoxy-β-chlorovinyloxy-1,3,2-dioxaphosphorinane-2-oxide |
| 4,4-dichloromethylpropylene-1-α-methyl-β-chlorovinyl-phosphate | 5,5-dichloromethyl-2-α-methyl-β-chlorovinyloxy-1,3,2-dioxaphosphorinane-2-oxide |
| 4-chloromethyl-4-acetoxymethylpropylene-1-β-dichlorovinylphosphate | 5-chloromethyl-5-acetoxymethyl-2,β-dichlorovinyloxy-1,3,2-dioxaphosphorinane-2-oxide |
| 4,4-dichloromethylpropylene-1-α-ethyl-β-dichlorovinyl-phosphate | 5,5-dichloromethyl-2-α-ethyl-β-dichlorovinyloxy-1,3,2-dioxaphosphorinane-2-oxide |
| 4,4-dichloromethylpropylene-1-α-methyl-β-dichlorovinylphosphate | 5,5-dichloromethyl-2-α-methyl-β-dichlorovinyloxy-1,3,2-dioxaphosphorinane-2-oxide |

Typical of the new and useful vinyl phosphates of the invention are the following:

4-chloromethyl-4-ethylpropylene-1-β-dichlorovinyl phosphate, 4-bromomethyl-4-ethylpropylene-1-β-dichlorovinyl phosphate, 4-chloromethyl-4-ethylpropylene-1-α-ethoxy-β-chlorovinyl phosphate, 4-chloromethyl-4-acetoxymethylpropylene-1-β-dichlorovinyl phosphate, 4-chloromethyl-4-dodecanoxymethylpropylene-1-β-dichlorovinyl phosphate, 4-chloromethyl-4-hexanoxymethylpropylene-1-β-dichlorovinyl phosphate, 4-chloromethyl-4-methylpropylene-1-β-dichlorovinyl phosphate, 4,4-dichloromethylpropylene-1-α-methyl-β-dichlorovinyl phosphate, 4-chloromethyl-4-ethylpropylene-1-α-methoxy-β-chlorovinyl phosphate, 4-chloromethyl-4-ethylpropylene-1-α-butoxy-β-chlorovinyl phosphate, 4,4-dichloromethylpropylene-1-α-ethyl-β-dichlorovinyl phosphate, 4,4-dichloromethylpropylene-1-α-butyl-β-dichlorovinyl phosphate, 4,4-dichloromethylpropylene-1-α-methyl-β-chlorovinyl phosphate.

A further embodiment of the invention provides a method for preparing the vinyl phosphates of the invention by a method which comprises bringing together a bicyclic phosphite of the general formula $$ZCH_2—C(CH_2O)_3P$$

in which Z has the definition given above with a compound of the general formula $$\begin{array}{c} R^1 \quad Y^1 \\ | \quad | \\ (O)C—C—Y^2 \\ | \\ X \end{array} \quad (II)$$

in which $R^1$, $Y^1$ and $Y^2$ are defined above and X is a halogen atom having an atomic number from 9 to 53 and including fluorine, chlorine, bromine and iodine.

The method for preparing the new vinyl phosphates is unusual because instead of splitting out the halogen in the form of an alkyl halide, it is retained in the vinyl phosphate product, thus enhancing its useful properties.

In the preparation of the vinyl phosphates, the reactants are generally used in stoichiometric amounts; but an excess of the compound is not detrimental to the reaction. Preferably, the temperature is maintained in the range of 100° to 280° C., especially from 100° to 210° C., the optimum temperature being readily determined to suit best the individual reactivity of the particular reactant used to react with the bicyclic phosphite. When the product is a solid, it precipitates out of the solution; in which case it may be separated by any suitable procedure; when the product is a liquid, it may be obtained by stripping off excess solvent and distilling off the product under reduced pressures. By suitable procedures, a purer product may be obtained.

Typical of the starting bicyclic phosphites that are employed in accordance with the invention, there may be named methyl bicyclic phosphite, butyl bicyclic phosphite, and ethyl bicyclic phosphite; hydroxymethyl bicyclic phosphite, chloromethyl bicyclic phosphite, iodomethyl bicyclic phosphite, bromomethyl bicyclic phosphite, fluoromethyl bicyclic phosphite, chloroethyl bicyclic phosphite, chlorobutyl bicyclic phosphite acetoxy bicyclic phosphite, butanoxymethyl bicyclic phosphite, isobutyroxymethyl bicyclic phosphite, octanoxymethyl bicyclic phosphite, dodecanoxymethyl bicyclic phosphite and the like.

These bicyclic phosphites may be prepared by a number of suitable methods, such as by the general procedure described in Journal of Americal Chemical Society, 78, 6413 (1956), by Hoffman, Moore, and Kogan as suitably modified to suit the instant situation. A method well adapted to prepare the bicyclic phosphite is the reaction of triethylphosphite with pentaerythritol with gradual removal of the alcohol under moderate heating such as in the range of 85° to 180° C. Another method of preparing the bicyclic phosphite is by reacting phosphorus trichloride with a trimethylol alkane at reduced temperatures, such as from 0° to 80° C., under a stream of nitrogen for the removal of the hydrogen chloride. Other methods known in the art may also be employed in the preparation of the bicyclic phosphites that are employed as starting materials in accordance with the invention.

In accordance with the invention, these bicyclic phosphites are intimately contacted with the reactant of Formula II. These reactants may be typified by the following: chloral and α,α-dichloropropionaldehyde; dichloro- and trichloroacetic acid alkyl esters, in which the alkyl group contains from one to four carbon atoms, such as trichloroacetic acid ethyl ester, dichloroacetic acid methyl ester, and trichloroacetic acid butyl ester; dichloro-2-alkanones containing from three to seven carbon atoms typified by 1,1-dichloro-2-propanone, 1,1-dichloro-2-pentanone, 1,1-dichloro-2-heptanone, and the like.

The vinyl cyclic phosphates of the invention have a wide variety of useful applications. In addition, they are useful as pesticides, particularly af fungicides, insecticides and herbicides.

In combatting pests, they may be used as dusts, wettable powders, self-dispersible concentrates, in solution or suspension. Compositions suitable as dusts are prepared from one or more vinyl cyclic phosphonates of this invention dispersed in a solid carrier, such as talc of clays. The compound may be used an an amount ranging from ½% to 25%. As wettable powders, the vinyl cyclic phosphonates, in a range of about 20% to 90%, are mixed with about 1% to 5% of a suitable wetting agent, such as a water-soluble, surface-active polyethoxyalkylphenoxypolyethoxyethanol and about 0.5% to 3% of a suitable dispersing agent, such as a formaldehyde condensed naphthalene-sulfonate. The wettable powder may then be suspended in an aqueous medium and applied as a spray. Also, the vinyl cyclic phosphonates of the invention may be formulated into self-emulsifiable or self-dispersible concentrates or as aqueous sprays. Since the salts of the vinyl cyclic phosphonates of the invention are water-soluble and possess good herbicidal and fungicidal properties, they offer a particularly suitable group where aqueous applications are desired.

The vinyl cyclic phosphonate of the invention may be employed as herbicides in pre-immergence or post-immergence applications. Generally, since the post-immergence applications offer somewhat preferred control, it is the recommended procedure.

The vinyl cyclic phosphonates of the invention are useful in controlling typical monocotyledons, such as duckweed, pondweed, undesirable grasses and herbs and dicotyledons typified by broad leaf plant species, such as curley dock and velvet leaf. In fungicidal tests, the vinyl cyclic phosphonates of the invention were found to be effective in the control of fungi as determined in standard tests against *Phytophthora infestans*, the late blight of tomato.

In testing the herbicidal properties of the vinyl cyclic phosphates of the invention against millet and wild oats (monocots) and against curley dock and velvet leaf (dicots), it was observed that the compounds in which Z and $Y^1$ and $Y^2$ are halogens exhibit very good fungicidal activity combined with good herbicidal effectiveness.

The following examples, in which all parts are by weight, unless otherwise indicated, are offered as illustrative of the method whereby the vinyl phosphates of the invention are prepared and are not to be construed as a limitation thereon.

*Example 1*

4-chloromethyl-4-ethylpropylene - 1 - β - dichlorovinyl phosphate is prepared by reacting 32.4 parts of ethyl bicyclic phosphite with 29.48 parts of chloral by heating with stirring the reactants at about 135° C. for three hours. The viscous mixture which results is distilled at reduced pressure giving a liquid distillate of the dichlorovinyl phosphate having a boiling point of 147° to 149° C. at 0.05 mm. and an $n_D^{27}$ 1.4964.

*Example 2*

4,4-dichloromethylpropylene - 1 - β- dichlorovinyl phosphate is prepared by adding to a reaction flask 18.2 parts of chloromethyl bicyclic phosphite and 14.7 parts of chloral. The solution is heated with stirring at a temperature of 135° C. for four hours. On cooling and standing overnight, the solution solidifies. After recrystallization from isooctane, the white crystalline vinyl phosphate is obtained; it has a melting point of 48° to 50° C.

*Example 3*

4-chloromethyl-4-ethylpropylene - 1 - α - ethoxy-β-dichlorovinylphosphate is prepared by heating together at 140° to 150° C. 32.4 parts of ethyl bicyclic phosphite and 38.3 parts of ethyl trichloroacetate. The product is separated by distilling under reduced pressure.

*Example 4*

There are reacted 36.9 parts of methyltrichloroacetate with 32.4 parts of ethyl bicyclic phosphite by heating together at a temperature in the range of 145° to 150° C. with stirring. The resulting viscous mixture is distilled under reduced pressure to give 4-chloromethyl-4-ethylpropylene-1-α-methoxy-β-dichlorovinyl phosphate.

*Example 5*

There are reacted by heating together at a temperature of 135° to 140° C. 33.5 parts of methyldichloroacetate with 32.4 parts of ethyl bicyclic phosphite. The product, which is separated by heating at reduced pressure, is 4-chloromethyl-4-ethylpropylene - 1 - α - methoxy-β-chlorovinyl phosphate.

Example 6

4,4-chloromethylpropylene - 1 - α - methyl-β-chlorovinyl phosphite is obtained by reacting with heating at 145° to 160° C. 36.4 parts of chloromethyl bicyclic phosphite and 25.2 parts of 1,1-dichloropropanone-2. The liquid product is obtained by distillation under reduced pressure.

Example 7

There are reacted 29.4 parts of 1,1-dichloro-2-hexanone with 36.4 parts of chloromethyl bicyclic phosphite at a temperature of 150° C. The liquid product is distilled under reduced pressure to give 4,4-dichloromethylpropylene-1-α-butyl-β-chlorovinyl phosphate.

From 1,1-dichloro-2-butanone, there is obtained in a like manner 4,4-dichloromethylpropylene-1-α - ethyl - β- chlorovinyl phosphate.

Example 8

There are reacted 11.3 parts of α,α-dichloropropionaldehyde with 18.2 parts of chloromethyl bicyclic phosphite by heating at 135° C. for four hours. The product which is obtained is 4,4-dichloromethylpropylene-1-β-chlorovinyl phosphate.

Example 9

There are heated at a temperature of 150° C. to 160° C. 41.2 parts of acetoxymethyl bicyclic phosphite with 14.7 parts of chloral. There is obtained 4-chloromethyl-4-acetoxymethylpropylene-1-β-dichlorovinyl phosphate.

In a like manner, there is prepared 4-chloromethyl-4-hexanoxymethylpropylene - α,β-dichlorovinyl phosphate from hexanoxymethyl bicyclic phosphite and chloral.

We claim:

1. A cyclic vinyl phosphate of the formula

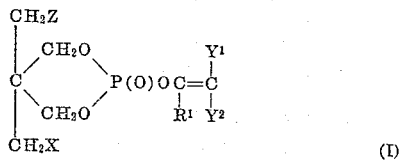

in which X is a halogen atom having an atomic number ranging from 9 to 53;
Z is (1) a hydrogen atom, (2) a halogen atom of an atomic number of 9 to 53, (3) an alkyl group containing from 1 to 4 carbon atoms, and (4) an acyloxy group in which the acyl group contains from 1 to 12 carbon atoms;
$R^1$ is selected from the group consisting of a hydrogen atom, an alkyl group containing from 1 to 4 carbon atoms, and an alkoxy group containing from 1 to 4 carbon atoms;
$Y^1$ is (1) a hydrogen atom and (2) a halogen atom of an atomic number of 9 to 53; and
$Y^2$ is (1) a hydrogen atom and (2) a halogen atom of an atomic number of 9 to 53;
with the proviso that $Y^1$ and $Y^2$ are never a hydrogen atom concurrently.

2. A cyclic vinyl phosphate of the formula

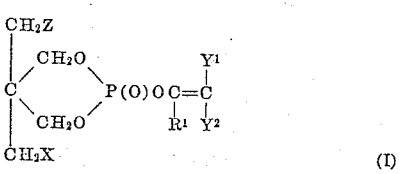

in which
X is a chlorine atom,
Z is an alkyl group containing from 1 to 4 carbon atoms;
$R^1$ is a hydrogen atom, and
$Y^1$ and $Y^2$ are each a chlorine atom.

3. 5 - chloromethyl - 5-ethyl - 2 - β - dichlorovinyloxy-1,3,2-dioxaphosphorinane-2-oxide.

4. A cyclic vinyl phosphate of the formula

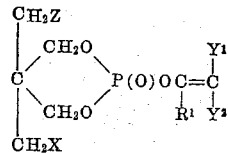

in which
X is a chlorine atom,
Z is an alkyl group containing from 1 to 4 carbon atoms,
$R^1$ is an alkoxy group containing from 1 to 4 carbon atoms, and
$Y^1$ and $Y^2$ are each a chlorine atom.

5. 5-chloromethyl-5-ethyl-2-α-ethoxy - β - chlorovinyl-oxy-1,3,2-dioxaphosphorinane-2-oxide.

6. A cyclic vinyl phosphate of the formula

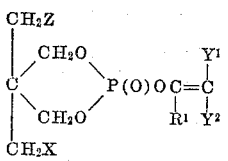

in which
X and Z are each a halogen atom having an atomic number ranging from 9 to 53,
$R^1$ is an alkyl group containing from 1 to 4 carbon atoms, and
$Y^1$ and $Y^2$ are each a chlorine atom.

7. 5,5 - dichloromethyl - 2 - α-methyl-β-chlorovinyloxy-1,3,2-dioxaphosphorinane-2-oxide.

8. A cyclic vinyl phosphate of the formula

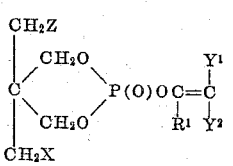

in which
X is a chlorine atom,
Z is an acyloxy group in which the acyl group contains from 1 to 12 carbon atoms,
$R^1$ is an alkyl group containing from 1 to 4 carbon atoms, and
$Y^1$ and $Y^2$ are each a chlorine atom.

9. 5-chloromethyl-5-acetoxymethyl-2-β - dichlorovinyl-oxy-1,3,2-dioxaphosphorinane-2-oxide.

10. A cyclic vinyl phosphate of the formula

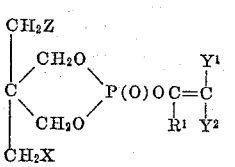

in which X is a halogen atom having an atomic number ranging from 9 to 53,
Z is (1) a hydrogen atom, (2) a halogen atom of an atomic number of 9 to 53, (3) an alkyl group containing from 1 to 4 carbon atoms, and (4) an acyloxyl group in which the acyl group contains from 1 to 12 carbon atoms;
$R^1$ is selected from the group consisting of a hydrogen atom, an alkyl group containing from 1 to 4 carbon atoms and an alkoxy group containing from 1 to 4 carbon atoms;
$Y^1$ is a hydrogen atom, and
$Y^2$ is a halogen atom having an atomic number from 9 to 53.

11. 5,5-dichloromethyl-2-α-ethyl-β - dichlorovinyloxy-1,3,2-dioxaphosphorinane-2-oxide.

12. A cyclic vinyl phosphate of the formula

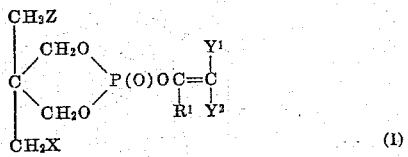

in which X and Z both are a halogen atom having an atomic number ranging from 9 to 53, Z is (1) a hydrogen atom, (2) a halogen atom having an atomic number of 9 to 53, (3) an alkyl group having from 1 to 4 carbon atoms, (4) an acyloxy group in which the acyl group contains from 1 to 12 carbon atoms;

$R^1$ is selected from the group consisting of a hydrogen atom, an alkyl group containing from 1 to 4 carbon atoms, and an alkoxy group containing from 1 to 4 carbon atoms;

$Y^1$ is (1) a hydrogen atom and (2) a halogen atom having an atomic number of 9 to 53; and $Y^2$ is (1) a hydrogen atom and (2) a halogen atom having an atomic number of 9 to 53;

with the proviso that $Y^1$ and $Y^2$ are never a hydrogen atom concurrently.

13. 5,5-dichloromethyl-2-α-methyl-β-dichlorovinyloxy-1,3,2-dioxaphosphorinane-2-oxide.

14. A process for the preparation of a cyclic vinyl phosphate of the formula

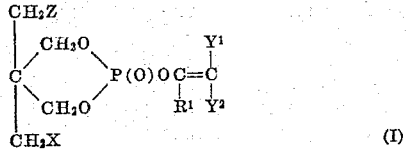

which comprises reacting at a temperature from 100° to 200° C. a bicyclic phosphite of the formula $$ZCH_2\text{---}C(CH_2O)_3P$$

with a compound of the formula

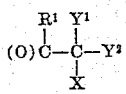

in which X is a halogen atom having an atomic number ranging from 9 to 53;

Z is (1) a hydrogen atom, (2) a halogen atom of an atomic number of 9 to 53, (3) an alkyl group containing from 1 to 4 carbon atoms, and (4) an acyloxy group in which the acyl group contains from 1 to 12 carbon atoms;

$R^1$ is selected from the group consisting of a hydrogen atom, an alkyl group containing from 1 to 4 carbon atoms, and an alkoxy group containing from 1 to 4 carbon atoms;

$Y^1$ is (1) a hydrogen atom and (2) a halogen atom of an atomic number of 9 to 53; and $Y^2$ is (1) a hydrogen atom and (2) a halogen atom of an atomic number of 9 to 53;

with the proviso that $Y^1$ and $Y^2$ are never a hydrogen atom concurrently.

15. The process of claim 14 in which the temperature is maintained within the range of about 100° to 200° C.

16. A process for the preparation of a cyclic vinyl phosphate of the formula of claim 14 in which $R^1$ is a hydrogen atom, $Y^1$ and $Y^2$ are each a chlorine atom, X is a halogen atom having an atomic number ranging from 9 to 53, and Z is (1) a hydogen atom and (2) a halogen atom having an atomic number of 9 to 53.

17. A process for preparing 4-chloromethyl-4-ethyl-propylene-1-β-dichlorovinyl phosphate which comprises bringing together equimolar amounts of an ethyl bicyclic phosphite of the formula $CH_3C(CH_2O)_3P$ and chloral at a temperature in the range of 110° to 150° C. and separating 5-chloromethyl-5-ethyl-2-β-dichlorovinyloxy-1,3,2-dioxaphosphorinane-2-oxide.

18. A process for the preparation of a cyclic vinyl phosphate of the formula of claim 14 in which $R^1$ is a hydrogen atom, $Y^1$ and $Y^2$ are each a chlorine atom, X is a halogen atom having an atomic number ranging from 9 to 53, and Z is (1) a hydrogen atom, (2) a halogen atom of an atomic number of 9 to 53, (3) an alkyl group containing from 1 to 4 carbon atoms, and (4) an acyloxy group in which the acyl group contains from 1 to 12 carbon atoms, which comprises reacting by bringing together at a temperature in the range of 200° to 280° C. a bicyclic phosphite of the formula $$ZCH_2\text{---}C(CH_2O)_3P$$

in which Z is defined above, with a trichloroacetic acid alkyl ester in which the alkyl group contains from 1 to 4 carbon atoms, and separating the resulting cyclic vinyl phosphate.

19. A process for preparing 4-chloromethyl-4-ethyl-propylene-1-α-ethoxy-β-dichlorovinyl phosphate which comprises heating together at a temperature in the range of 140° to 150° C. an equimolar amount of an ethyl bicyclic phosphite of the formula $CH_3C(CH_2O)_3P$ and ethyl-trichloroacetate, and separating the resulting cyclic vinyl phosphate.

References Cited in the file of this patent

UNITED STATES PATENTS 2,834,798    Hechenbleikner et al. _____ May 3, 1958

OTHER REFERENCES

Chemical Abstracts, 5th Decennial Index, page 4229S, top of column 3.